United States Patent [19]
Kubat

[11] Patent Number: 6,046,904
[45] Date of Patent: Apr. 4, 2000

[54] ELECTRICAL EQUIPMENT CABINET HAVING BARRIER WITH INTEGRAL DRIP CHANNEL

[75] Inventor: Michael A. Kubat, Lincoln, Ill.

[73] Assignee: Eaton Corporation, Cleveland, Ohio

[21] Appl. No.: 09/266,348

[22] Filed: Mar. 11, 1999

[51] Int. Cl.[7] .................................................. H02B 1/00
[52] U.S. Cl. .......................... 361/659; 361/600; 361/601; 361/660; 361/832; 361/641; 174/54; 174/56; 174/66; 174/52.1
[58] Field of Search ..................................... 361/600, 601, 361/622, 627, 628, 634, 641, 659, 660, 832; 174/54–56

[56] References Cited

U.S. PATENT DOCUMENTS

| | | | |
|---|---|---|---|
| 3,746,936 | 7/1973 | Coffey et al. | 361/641 |
| 4,532,574 | 7/1985 | Reiner et al. | 361/660 |
| 5,638,256 | 6/1997 | Leach et al. | 361/641 |
| 5,751,543 | 5/1998 | Gehrs et al. | 361/641 |
| 5,870,276 | 2/1999 | Leach et al. | 361/627 |

Primary Examiner—Leo P. Picard
Assistant Examiner—Boris L. Chervinsky
Attorney, Agent, or Firm—Martin J. Moran

[57] ABSTRACT

A cabinet for housing first and second pieces of electrical equipment and having a first compartment adjacent a second compartment for housing the respective first and second pieces of electrical equipment. The cabinet has a first cover member overlying at least a portion of the first compartment and a second cover member overlying at least a portion of the second compartment and defining a seam therebetween. The cabinet also has a barrier positioned between the first and second compartments and extending generally transverse to the cover members. The barrier includes a wall and a drip channel, where the drip channel is integrally formed with the wall and extends longitudinally adjacent the seam to resist penetration of water into the cabinet.

8 Claims, 3 Drawing Sheets

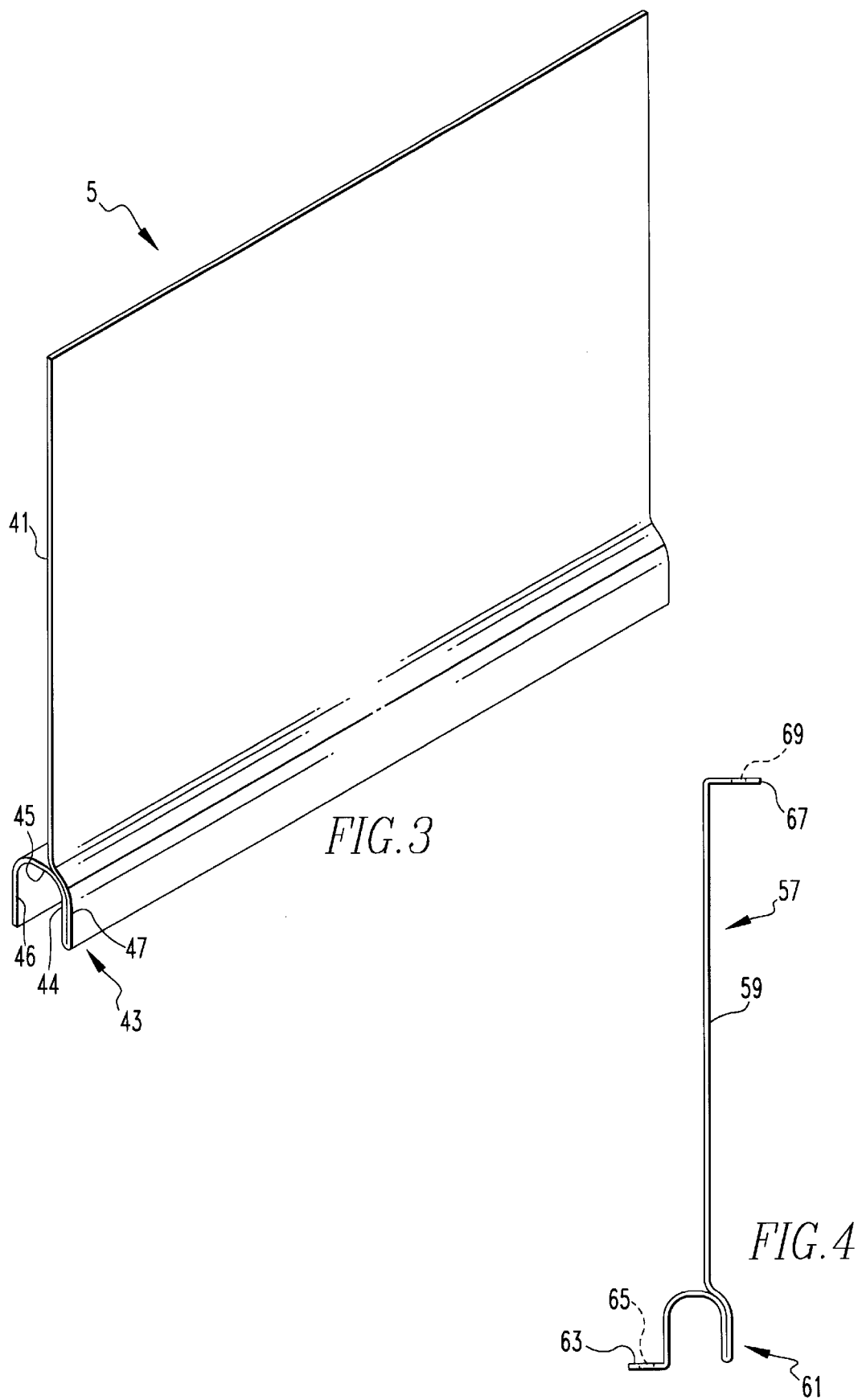

ELECTRICAL EQUIPMENT CABINET HAVING BARRIER WITH INTEGRAL DRIP CHANNEL

BACKGROUND OF THE INVENTION

1. Field of the Invention

This invention relates to cabinets for housing pieces of electrical equipment, and more particularly, to such a cabinet having a barrier with an integrally formed drip channel for separating the pieces of electrical equipment and resisting penetration of water into the cabinet.

2. Background Information

Typically, electrical equipment is housed within a cabinet to, for example, limit access to the electrical equipment for safety reasons or to protect the electrical equipment from the weather when it is necessary to place the electrical equipment in an outdoor environment. One example of electrical equipment contained within a housing that must address both the safety and weather concerns is a meter center. Meter centers are used for metering electric power delivered to multiple tenants from a common feeder system and are usually mounted to the exterior of a building. Typically, a meter center includes an upright cabinet forming an enclosure divided into side-by-side meter and disconnect switch compartments. Obviously, it is important to prevent undesired access to the meter center to prevent bodily injury. It is also important to limit or resist the penetration of water into the meter center to maintain the integrity and operability of the electrical equipment contained therein.

The construction of such meter centers is known to include a barrier wall between the meter compartment and disconnect switch compartment and to employ cover members to allow access to one or both of the compartments. Thus, if one is accessing, for example, the meter compartment following removal of the appropriate cover member, the barrier wall prevents access to the disconnect switch compartment. Of course, the same holds true if one is accessing the disconnect switch compartment where the barrier wall would restrict access to the meter compartment. Because of the seam or joint formed by the cover members, such meter centers are also known to have a drip channel attached to the barrier wall such that the drip channel extends longitudinally adjacent the seam or joint. The drip channel resists the penetration of water into the meter center. Typically, the meter center is attached to the barrier wall by fastening means, such as a bolt or screw. One example of such an arrangement is disclosed in U.S. Pat. No. 4,532,574.

It has been determined that a drip channel that is bolted or screwed to a barrier wall has several disadvantages. For example, the formation of rust in or around the location of the bolt or screw, typically caused by water reaching the drip channel, can eventually result in the degradation of the drip channel and allow water to penetrate the meter center. In addition, connecting a drip channel to a barrier wall using the described bolt or screw arrangement where the drip channel is typically wider than the barrier wall, results in the formation of an unstable structure. This is an undesirable result, particularly because the barrier wall and drip channel provides structural support to the cabinet making up the meter center.

There is a need, therefore, for an improved structure for separating compartments of a cabinet for housing electrical equipment, such as a meter center.

There is also a need for such an improved structure that more effectively and durably resists the penetration of water into the cabinet.

There is a further need for such an improved structure that provides an effective and reliable structural support for the cabinet housing the electrical equipment.

There is an additional need for such a structure which may be incorporated into existing designs of cabinets for housing electrical equipment and may be cost-effectively manufactured and installed.

SUMMARY OF THE INVENTION

These needs and others are satisfied by the invention, which is directed to a cabinet for housing first and second pieces of electrical equipment. The cabinet includes a first compartment adjacent a second compartment, with the first piece of electrical equipment situate in the first compartment and the second piece of electrical equipment situate in the second compartment. The cabinet also includes a first cover member overlying at least a portion of the first compartment and a second cover member overlying at least a portion of the second compartment, where the first and second cover members define a seam that is formed therebetween. The cabinet also includes a barrier comprising a wall and a drip channel integrally formed with the wall. The wall portion of the barrier is positioned between the first and second compartments to separate the first and second pieces of electrical equipment. Preferably, the wall portion of the barrier extends generally transversely to the first and second cover members. The drip channel extends longitudinally adjacent the seam formed between the first and second cover members to resist penetration of water into the cabinet. Advantageously, the invention provides an improved structure for providing greater resistance to water penetrating the cabinet and provides increased structural support for the cabinet while providing an effective barrier to separate the first and second pieces of electrical equipment.

BRIEF DESCRIPTION OF THE DRAWINGS

A full understanding of the invention can be gained from the following description of the preferred embodiments when read in conjunction with the accompanying drawings in which:

FIG. 3 is an isometric view of a barrier of the invention comprising a wall with an integrally formed drip channel.

FIG. 4 is an end view of an alternate embodiment of the barrier of the invention.

DESCRIPTION OF THE PREFERRED EMBODIMENTS

The invention pertains generally to cabinets for housing pieces of electrical equipment, and more particularly, to such a cabinet having a barrier with an integrally formed drip channel for separating the pieces of electrical equipment resisting penetration of water or moisture into the cabinet. While the invention may be applicable to many different types of cabinets or electrical apparatus for housing pieces of electrical equipment where there is a need for separating the pieces of electrical equipment and/or resisting penetration of water or moisture into the cabinet, the present invention will be described and illustrated in the context of a meter center in which power is delivered to multiple users and separately metered. Meter centers are generally known in the art and a complete description of a typical meter center, including its components and operation, is shown, for example, in commonly owned U.S. Pat. No. 4,532,574, the complete disclosure of which is hereby incorporated by reference.

Figure 1:
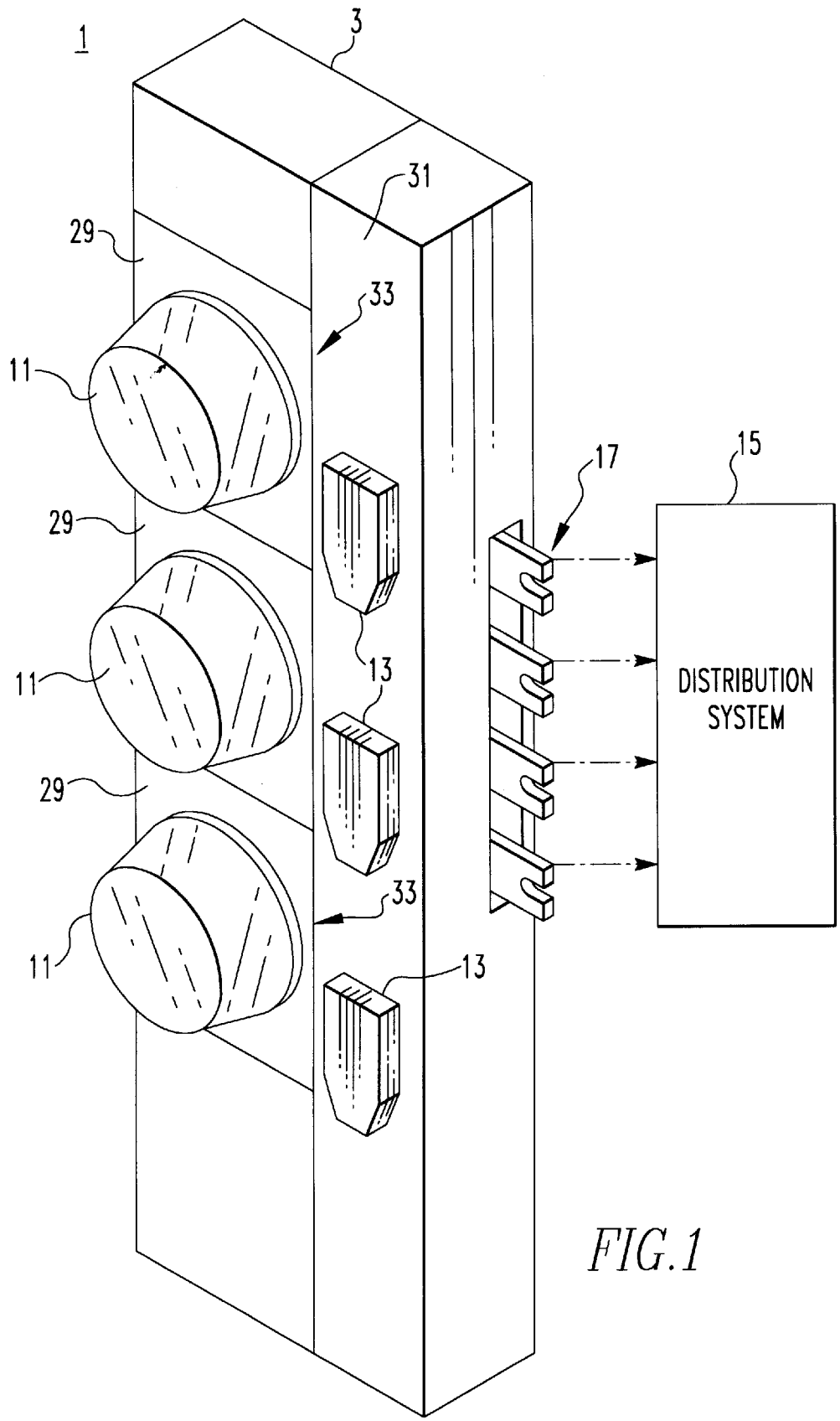
FIG. 1 is an isometric view of a meter center in accordance with the invention.
Figure 2:
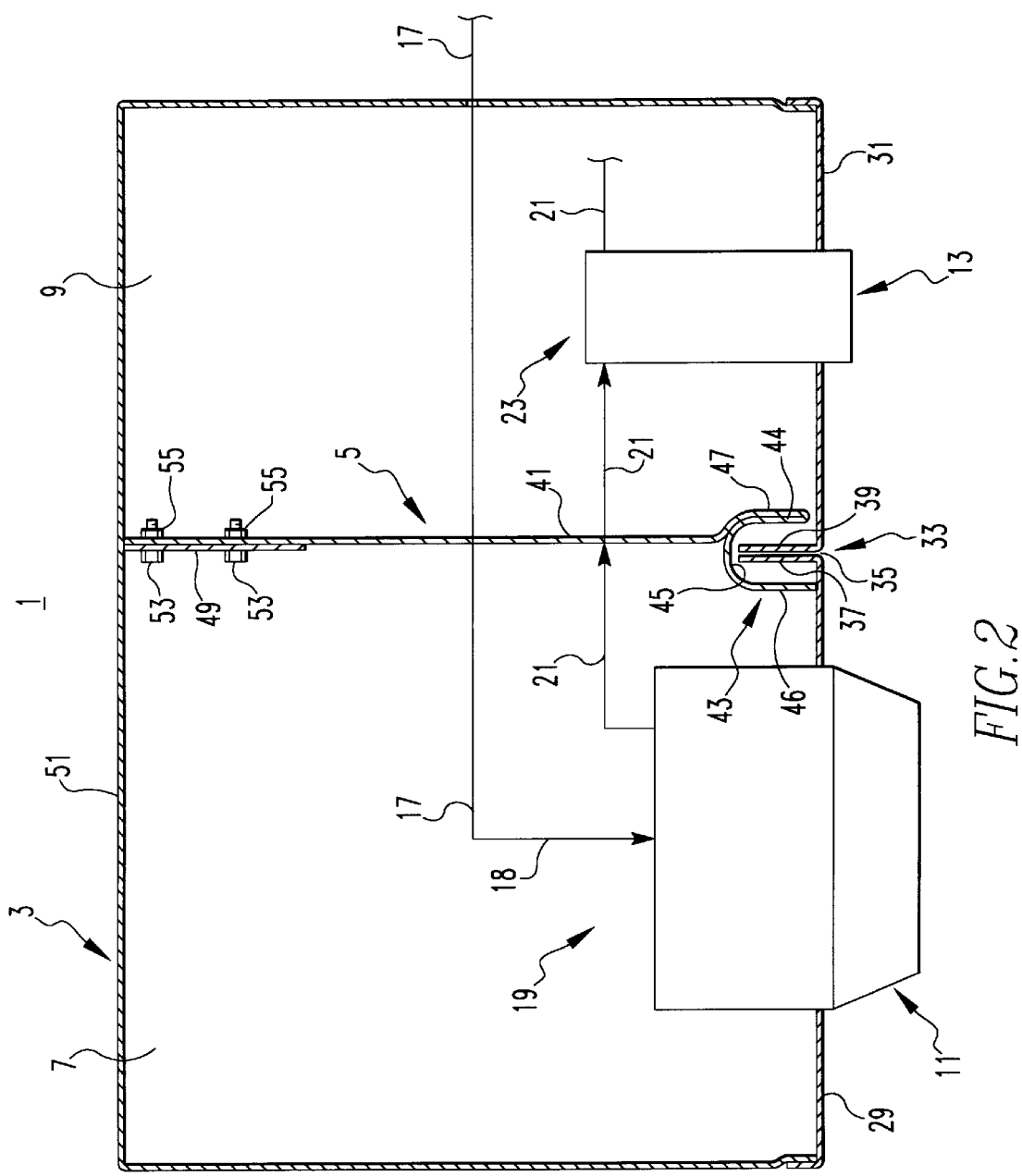
FIG. 2 is a horizontal sectional view, shown schematically, through the meter center shown in FIG. 1.

Referring to FIGS. 1–3, the meter center 1 of the invention includes a cabinet 3 forming an enclosure which has an internal barrier, generally designated by reference numeral 5, dividing the enclosure into a meter compartment 7 and a disconnect switch compartment 9. Mounted in the meter compartment 7, as is generally known, are a number of meters 11, one for each tenant circuit to be metered. Each tenant circuit is provided with a disconnect switch 13, which may be, for example, a circuit breaker mounted in the disconnect switch compartment 9.

Electric power is provided to the meter center 1 from a utility power distribution system, shown schematically and generally designated by reference numeral 15, which feeds the electric power to the meter center 1 by feeder buses, generally designated by reference numeral 17, as is known in the art. For example, the feeder buses 17 may include three phases and a neutral bus. The feeder buses 17 extend horizontally into the cabinet 3 and through both compartments 7 and 9. Feeder buses 17 are connected to vertical supply buses, generally designated by reference number 18, which in turn are electrically connected to meters 11. It will be appreciated that the meters 11 and associated buses, as well as other electrical components associated therewith and generally known in the art, that are situate generally within meter compartment 7, will be referred to herein generally as first piece of electrical equipment 19. Each of the tenant circuits for which the meter center 1 provides metered power has a set of tenant bus bars, generally designated by reference numeral 21, that extend from the meters 11 and through the disconnect switch 13, which for example may be a circuit breaker. The switch 13 and associated buses, as well as other electrical components associated therewith and generally known in the art, that are situate generally within compartment 9 will be referred to herein generally as second piece of electrical equipment 23. It will be appreciated that the first piece of electrical equipment 19 and the second piece of electrical equipment 23, as well as the associated equipment for operatively connecting the components of the meter center 1, are generally known in the art and fully described in the earlier referenced U.S. Pat. No. 4,532,574.

The cabinet 3 of the meter center 1 includes one or more first cover member 29 generally overlying the meter compartment 7. The first cover member 29 provides a means for covering the electrical equipment 19 so as to restrict access to the electrical equipment 19 and/or protect the equipment from the weather when the meter center (as is typical) is situated in an outdoor environment. As shown, the first cover member 29 provides for the meters 11 to extend therethrough for providing the operative association with the electrical equipment 19.

The cabinet 3 of the meter center 1 also includes one or more second cover member 31 generally overlying the disconnect switch compartment 9. As shown, the second cover member 31 provides for the disconnect switch 13 to extend therethrough in order that the switch 13 may be connected to the electrical equipment 23. The second cover member 31 also restricts access to the compartment 9 and the electrical equipment 23 contained therein.

The first cover member 29 and the second cover member 31 define a seam 33 that is formed therebetween. The seam 33 extends longitudinally between the first cover member 29 and the second cover member 31 and results in the formation of a gap 35 between a first drip flange 37 of the first cover member 29 and a second drip flange 39 of the second cover member 31. Preferably, the gap 35 has a width in the range of about 1/32 inch to 1/4 inch. The described construction and arrangement of the first cover member 29 with respect to the second cover member 31 advantageously allows removal of one or both of the cover members to provide access to the respective compartments.

As previously stated, the cabinet 3 includes a barrier 5 that acts as a divider between the meter compartment 7 and the disconnect switch compartment 9. The barrier 5 extends generally transverse to the first cover member 29 and the second cover member 31. The barrier 5 comprises a wall 41 and a drip channel generally designated by the reference numeral 43. The drip channel 43 extends longitudinally adjacent the seam 33 and the gap 35 formed between the first cover member 29 and the second cover members 31. The drip channel 43 extends generally vertical within the cabinet 3 as viewed in FIGS. 1 and 2. The drip channel 43 is preferably formed in a generally U-shape having a first leg member 44 and a second leg member 46.

The drip channel 43 is positioned such that the drip flanges 37 and 39 of respective cover members 29 and 31 are in communication therewith. Specifically, as best shown in FIG. 2, the drip flanges 37 and 39 extend into the generally U-shaped drip channel 43. Because of the seam 33 formed between the first cover member 29 and the second cover members 31 and the gap 35 between the drip flanges 37 and 39, there exists the potential for water or moisture to penetrate through the gap 35, particularly when the meter center 1 is located in an outdoor environment. Therefore, it will be appreciated that the drip channel 43, by extending longitudinally adjacent the seam 33 and the gap 37, serves as a means to resist penetration of water or moisture into the cabinet 3. It will be appreciated that the drip channel 43 may be formed of any other suitable shape or configuration for positioning adjacent the seam 33 and the gap 35 to resist penetration of water or moisture into the cabinet 3 so as to avoid possible damage to the electrical equipment 19 and/or the electrical equipment 23.

As best shown in FIGS. 2 and 3, the barrier 5 is formed of a unitary piece of material such that the drip channel 43 is integrally formed with the wall 41. For example, the barrier 5, and more specifically the unitary piece of material that forms the barrier, may be bent or shaped to form the drip channel 43 into, for example, the described generally U-shape. Of course, the integrally formed drip channel 43 and wall may be formed by any known method or means of metal working that will result in the integrally formed and continuous structure of the invention. Advantageously, integrally forming the wall 41 and the drip channel 43 and working the material to produce the desired structure makes the manufacture of the barrier 5 simpler and more economical than the manufacture of existing prior art structures of this type.

In addition, integrally forming the wall 41 and the drip channel 43 to construct the barrier 5 results in the drip channel 43 having a continuous water-resisting surface 45 for directing the water that penetrates between the seam 33 and the gap 35 away from the electrical equipment contained in the cabinet 3. In other words, the drip channel 43 does not include any holes or apertures through which a fastening means, such as a bolt or screw, would need to extend to connect the drip channel 43 to the wall 41. As a result of the continuous construction of the wall 41 and the drip channel 43, the drip channel 43, and more specifically the continuous water-resisting surface 45, will be more durable than existing structures of this type and will be less likely to deteriorate due to exposure to the weather.

Another advantage of integrally forming the wall 41 and the drip channel 43 from a continuous piece of material is that at least a portion 47 of the wall 41 is contiguous with at least one of the leg members 44, 46 of the drip channel 43. As shown, the portion 47 of wall 41 is contiguous with leg member 44. It will be appreciated that by forming barrier 5 by folding or otherwise shaping to achieve the described structure, the contiguous positioning of wall portion 47 and leg member 44 results in a barrier 5 that is superior to previously known barriers. This results in increased structural support to the drip channel 43, as well as to the cabinet 3 of the meter center 1.

As shown in FIG. 2, the barrier 5 may be connected to the cabinet 3 by, for example, providing an extended wall portion 49 that extends inwardly from a back wall 51 of the cabinet 3 such that the extended wall portion 49 is adjacent the barrier 5. Fastening means, such as bolts 53 and cooperating nuts 55, may be provided for securing the barrier 5 to the extended wall portion 49.

Alternatively, as shown in FIG. 4, another embodiment of the invention is provided that includes means for securing the barrier to the cabinet 3. Barrier 57 comprises a wall 59 and a drip channel 61 wherein a first mounting flange 63, which extends generally transversely from the drip channel 61, is positioned adjacent one of the cover members 29 and 31 for securing the barrier 57 to one of the cover members 29 and 31. The first mounting flange 63 includes an aperture 65 extending therethrough for receiving a fastening means, such as a bolt (not shown), that would also extend through one of the cover members 29 and 31 for securing the barrier 57 in position. Similarly, a second mounting flange 67 may be provided that extends generally transversely from the wall 59 adjacent the back wall 51 of the cabinet 3 for securing the barrier 57 to the back wall 51. The second mounting flange 67 may include an aperture 69 extending therethrough for receiving a fastening means, such as a bolt (not shown), for securing the barrier 57 in position. Otherwise, the construction and operation of the barrier 57 are similar to the described construction and operation of the barrier 5. Of course it will be appreciated that a barrier may be formed with only one of the mounting flanges 63, 67 or both.

Preferably, the barriers 5 and 57 are formed of galvanized steel in order to comply with applicable electrical codes. However, it will be appreciated that the barriers 5 and 57 may be constructed of other suitable materials, if necessary, depending on the particular application of the barrier.

Accordingly, it will be appreciated that the invention as described herein provides for an improved structure for separating compartments of a cabinet for housing electrical equipment such as a meter center as described herein. The improved structure comprises a barrier 5 positioned between a meter compartment 7 and a disconnect switch compartment 9 of the meter center 1, where the barrier 5 extends generally transverse to cover members 29 and 31. In accordance with an important aspect of the invention, the barrier 5 comprises a wall 41 and a drip channel 43 where the drip channel 43 is integrally formed with the wall 41. The drip channel 43 extends longitudinally adjacent seam 33 and gap 35 formed between the drip flanges 37 and 39 to effectively resist the penetration of water or moisture into the cabinet 3. The resistance to penetration of water or moisture into the cabinet 3 is enhanced by the integral formation of the wall 41 and the drip channel 43 and the continuous construction thereof. The described construction of barrier 5 results in a more structurally reliable barrier 5 that serves as a structural support for the cabinet 3.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A cabinet for housing first and second pieces of electrical equipment, said cabinet comprising:

a first compartment adjacent a second compartment, said first piece of electrical equipment situate in said first compartment and said second piece of electrical equipment situate in said second compartment;

a first cover member overlying at least a portion of said first compartment and a second cover member overlying at least a portion of said second compartment, said first cover member and said second cover member defining a seam that is formed therebetween; and a barrier positioned between said first compartment and said second compartment and extending generally transverse to said first cover member and said second cover member, said barrier comprising a wall and a drip channel, said drip channel being integrally formed with said wall, said drip channel extending longitudinally adjacent said seam to resist penetration of water into said cabinet.

2. The cabinet of claim 1 wherein said barrier is formed of a unitary piece of material that is constructed and arranged to form said drip channel having a generally U-shape.

3. The cabinet of claim 1 wherein said drip channel includes at least one leg; and at least a portion of said wall is constructed and arranged to be contiguous with said at least one leg of said drip channel.

4. The cabinet of claim 1 wherein said barrier includes a first mounting flange extending generally transversely from said drip channel, said first mounting flange positioned adjacent one of said first cover member and said second cover member for securing said barrier thereto.

5. The cabinet of claim 4 wherein said barrier includes a second mounting flange extending generally transversely from said wall for securing said barrier to said cabinet.

6. The cabinet of claim 1 wherein said barrier includes a mounting flange extending generally transversely from said wall for securing said barrier to said cabinet.

7. The cabinet of claim 1 wherein at least one of said first cover member and said second cover member includes a drip flange extending generally transversely therefrom, said drip flange extending into said drip channel.

8. The cabinet of claim 1 wherein said barrier is formed of galvanized steel.

\* \* \* \* \*